United States Patent [19]

Upmeier

[11] 3,804,572

[45] Apr. 16, 1974

[54] APPARATUS FOR MAKING TUBULAR PLASTICS FILM BY MEANS OF A BLOWHEAD

[75] Inventor: Hartmut Upmeier, Tecklenburg, Germany

[73] Assignee: Windmoller & Holscher, Lengerich of Westphalia, Germany

[22] Filed: Oct. 19, 1971

[21] Appl. No.: 190,535

[30] Foreign Application Priority Data
Oct. 23, 1970 Germany.............................. 2052127

[52] U.S. Cl. ............................... 425/326 R, 425/72
[51] Int. Cl. ............................................. B29d 23/04
[58] Field of Search ............ 425/72, 326, 387, 455, 425/325, 327, 328, 367, 374

[56] References Cited
UNITED STATES PATENTS

| | | | |
|---|---|---|---|
| 2,337,927 | 12/1943 | Reichel et al. .................. | 425/326 X |
| 3,456,044 | 7/1969 | Pahlke ............................ | 425/326 X |
| 3,687,585 | 8/1972 | Takagi et al. ..................... | 425/71 |
| 3,231,651 | 1/1966 | Cheney............................ | 425/315 |
| 3,238,564 | 3/1966 | Fry.................................. | 425/319 |

FOREIGN PATENTS OR APPLICATIONS

| | | | |
|---|---|---|---|
| 922,084 | 3/1963 | Great Britain..................... | 425/326 |
| 1,553,853 | 12/1968 | France............................. | 425/326 |

Primary Examiner—J. Spencer Overholser
Assistant Examiner—David S. Safran
Attorney, Agent, or Firm—Fleit, Gipple & Jacobson

[57] ABSTRACT

In apparatus for making tubular plastics film by means of a blowhead which forms the film as a continuously moving tube, flattening means for the tube and take-off rollers for the flattened tube, the spacing between the blowhead and the take-off rollers is made constant but the spacing between the blowhead and the flattening means is adjustable.

8 Claims, 1 Drawing Figure

PATENTED APR 16 1974
3,804,572
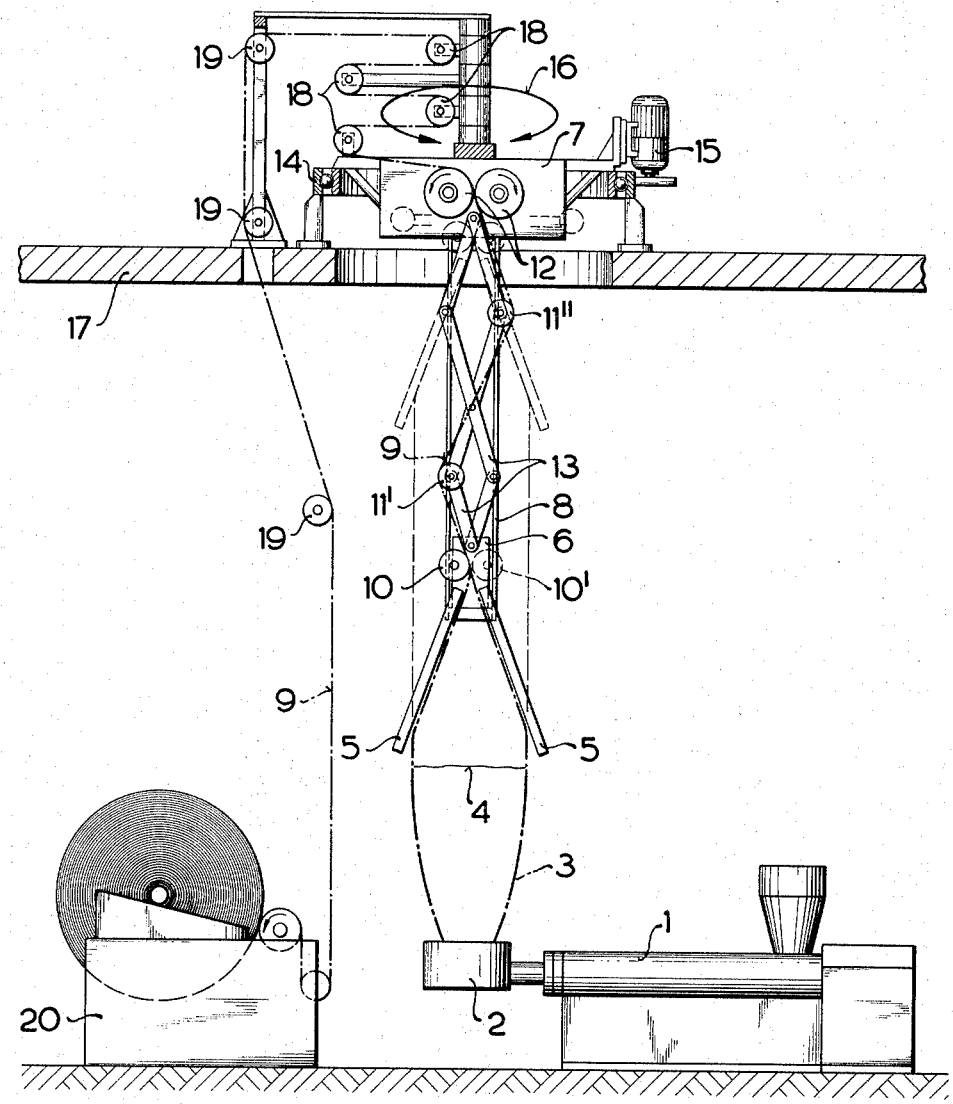
INVENTOR
Hartmut UPMEIER
By
Fleit, Gipple & Jacobson
his ATTORNEYS

APPARATUS FOR MAKING TUBULAR PLASTICS FILM BY MEANS OF A BLOWHEAD

The invention relates to an apparatus for making tubular plastics film by means of a blowhead and take-off means equipped with flattening means.

In the production of tubular film from thermoplastic materials it is desirable to obtain a cleanly wound coil of flattened film. If the coil contains beads or bulges this has the effect of impeding the further processing of the film because, when the film is uncoiled it is no longer flat but distorted at regular intervals corresponding to the positions of the beads or bulges in the coil.

It has been found that cleanly coiled flattened tubular film is difficult to obtain or cannot be obtained at all by means of rotary or oscillatory blowheads or even by means of apparatus in which the extruder as well as the blowhead are rotated or oscillated about the longitudinal axis of the extruder. The desired effect can be achieved only if the take-off means for the film are mounted for rotation or oscillation. For this purpose it is known to rotate the coiling station together with the take-off means (this being impractical because of the roll replacement and because of the desired coil diameter) or to feed the film through suitable turning stations between the oscillating take-off means and a stationary coiler or some machine for processing the film further.

In more recent times decidedly greater importance has been placed on stiff creasable films, for example high-density high-molecular low-pressure polyethylene. In order to be able to flatten such films without creasing in the first place, the tube must be flattened immediately after it has solidified and whilst it is still in a hot and comparatively flexible condition. The take-off means have therefore been made adjustable in height but adjustability for height involves an increase in constructional costs because of the weight of the take-off means and of an operating platform on which the take-off means are mounted. Usually, it is necessary to provide a special take-off tower because the adjusting means are difficult to adapt structurally to existing take-off platforms. This expenditure becomes uneconomical if, as is also preferred for this kind of film, the take-off means are mounted for oscillation.

The invention aims to provide a simple and relatively cheap apparatus in which the tubular film can be flattened immediately after it has solidified, the distance downstream of the blowhead at which solidification takes place being dependent on the operating conditions, the nature of the plastics material and the film thickness.

According to the invention, there is provided apparatus for making tubular plastics film comprising a blowhead for forming the film as a tube and take-off means, the take-off means comprising means downstream of the blowhead as viewed in the direction of film travel for flattening the tube and take-off rollers downstream of the flattening means for withdrawing the flattened tube, the spacing between the blowhead and the take-off rollers being constant and that between the blowhead and the flattening means being adjustable. Thus, in the case of vertical operation, it is no longer the entire take-off means which are reciprocated vertically in order to perform flattening at an elevation which is suitable for the film material in question. Instead, only the flattening means such as flattening plates are adjusted by raising or lowering them to meet requirements. Such height adjustment of the flattening means can readily be provided on existing oscillatory take-off means disposed at a greater elevation for the normal high speed production of tubular film.

A plurality of adjustably located guide rollers may be disposed between the flattening means and the take-off rollers for leading the flattened tube in a zig-zag path. The zig-zag formation keeps the flattened film taut and the changes in direction of movement of the film brought about by the guide rollers have an adequate squeezing effect on the film to prevent it from being inflated again by air from the blowhead. For thick films where re-inflation might still be possible, a pair of squeeze rollers for the film spring-biased towards one another may be mounted directly downstream of the flattening means for movement therewith. If the same equipment is then to be used for thin films in which squeeze rollers might cause excessive braking of the film, provision could be made for lifting one of the squeeze rollers off the other.

A side elevation of a vertically operative apparatus according to the invention is shown in the accompanying diagrammatic drawing to which reference will now be made.

Tubular plastics film 3 is formed by a blowhead 2 of an extruder 1. Solidification of the tubular film has taken place at the position of the line indicated by the reference numeral 4. Immediately downstream of the line 4 there is a pair of flattening plates 5. The plates 5 are adjustable for height by being mounted on slides 6 which are guided along rails 8 supported by a take-off frame 7. For the sake of clarity, drive means for the slides 6 to bring about height adjustment of the plates 5 have not been illustrated. Such drive means may be in the form of screws or cables.

The flattened film is indicated at 9. Downstream of the flattening plates, the flattened film is deflected to one side by means of an auxiliary roller 10 carried at the top of one of the flattening plates 5. Thereafter the film 9 is passed over further auxiliary rollers 11', 11'' etc. to follow a zig-zag path towards a pair of take-off rollers 12 supported by the take-off frame 7. The latter, and the take-off rollers carried thereby, can be rotated back and forth as indicated by the arrows 16. The zig-zag path for the film 9 ensures that the film is kept taut and the fact that the film is passed over the auxiliary rollers 10, 11', 11'' which exert a certain squeezing effect on the film makes it unlikely that the film will be reinflated by air coming from the blowhead 2. However, the squeezing effect can be enhanced in the case of films of greater thickness by providing the auxiliary roller 10 with a spring-biassed backing roller 10' which is not positively driven. The rollers 10, 10' then constitute a pair of squeeze rollers. If the apparatus is to be used for thin films where squeeze rollers are unnecessary and would only exert a braking effect on the film, provision may be made for keeping the auxiliary roller 10' lifted off the roller 10.

It is advantageous to mount the auxiliary rollers at alternate corner joints of two pairs of lazy tongs or scissor linkages 13. In the most elevated position of the flattening plates 5, as shown in broken lines in the drawing, the auxiliary rolls would then lie side-by-side directly upstream of the pair of take-off rollers 12. In this case the production of the usual flexible tubular film is possible at high speed and the flattened film 9 is fed directly to the take-off rollers. However, in a simplified construction it is also possible to provide the rollers 11' and 11" with appropriate clamp holders by hand. The take-off frame 7 is mounted on a circular rack 14 and driven alternately clockwise and anti-clockwise in the direction of the arrows 16 by means of a motor 15 provided with suitable direction-changing terminal switches. The take-off means are supported by an elevated platform 17.

Downstream of the take-off rollers 12, the flattened film 9 is passed over a system 18 of turning bars which swing horizontally in the manner of a fan and which are the subject of one of our prior patent applications. Thereafter, the flattened film is passed over guide rollers 19 to a stationary coiler 20.

Instead of the zig-zag passage of the film between the flattening plates 5 and take-off rollers 12, the film could be fed in a straight line direct to the take-off rollers. In this case the squeeze rollers 10, 10' are essential because no squeezing effect is now exerted on the film by the rollers 11' and 11" to prevent reinflation of the flattened film by air coming from the blowhead 2.

It is to be understood that the invention is also applicable to apparatus in which the film is blown as a bubble either sideways or vertically downwards.

I claim:

1. An apparatus for making tubular plastic film comprising a blowhead for forming a tube of plastic film, flattening means located downstream of said blowhead for flattening said tube, take-off rollers located downstream of said flattening means for withdrawing said flattened tube, a means for adjusting the distance between said blowhead and said flattening means such that the distance between said blowhead and said take-off rollers remains constant, and guide rollers for maintaining said flattened tube taut and preventing reinflation thereof located between said flattening means and said take-off rollers.

2. The apparatus of claim 1 wherein said guide rollers are positioned to lead said flattened tube in a zig-zag path and means for adjusting the position of said guide rollers relative to said flattening means and said take-off rollers.

3. The apparatus of claim 1 and further comprising a pair of squeeze rollers positioned immediately downstream of said flattening means and mounted for movement therewith and spring biasing means for biasing said squeeze rollers toward one another.

4. The apparatus of claim 3 in which said squeeze rollers are mounted so that one of said squeeze rollers can be moved away from the other of said squeeze rollers.

5. The apparatus of claim 1 in which said flattening means comprise flattening plates.

6. The apparatus of claim 1 in which said means for adjusting the distance between said blowhead and said flattening means comprises guide rails and a slide moveable on said guide rails and on which said flattening means are mounted.

7. The apparatus of claim 2 in which said means for adjusting the position of said guide rollers relative to said flattening means and said take-off rollers comprises lazy tongs on which said guide rollers are mounted.

8. The apparatus of claim 1 and further comprising means rotatably mounting said take-off rollers.

* * * * *